Feb. 9, 1971 H. H. ABDELLA 3,562,187
SPARK PLUG CONDUCTIVE GLASS SEAL
Filed June 26, 1968
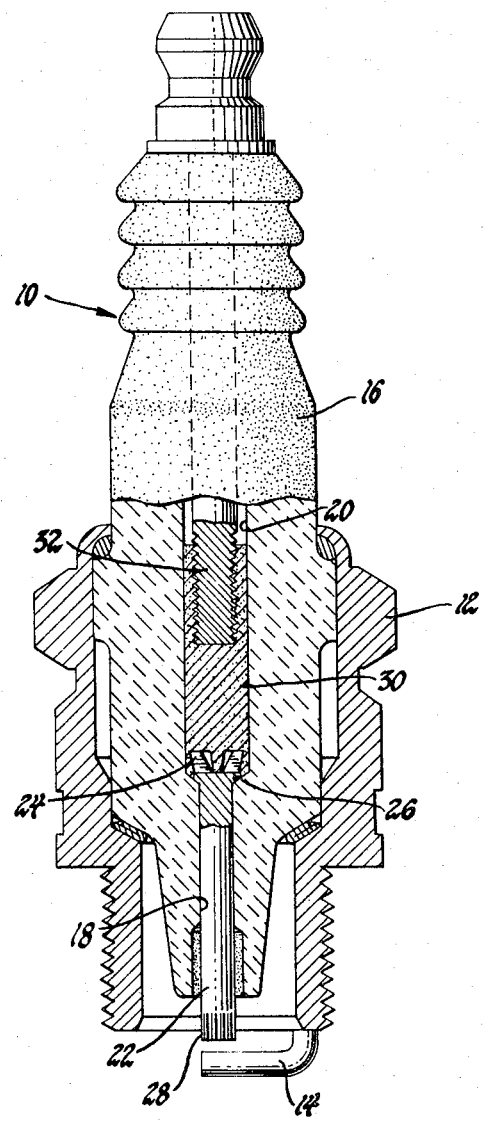
INVENTOR.
Harold H. Abdella
BY
Joseph E. Kieninger
ATTORNEY

United States Patent Office 3,562,187
Patented Feb. 9, 1971

3,562,187
SPARK PLUG CONDUCTIVE GLASS SEAL
Harold H. Abdella, Davison, Mich., assignor to General Motors Corporation, Detroit, Mich., a corporation of Delaware
Filed June 26, 1968, Ser. No. 740,369
Int. Cl. C03c 3/04; H01b 1/02
U.S. Cl. 252—513      5 Claims

ABSTRACT OF THE DISCLOSURE

A hermetic ceramic-to-metal conductive glass seal for use in spark plugs and the like containing glass, iron and aluminum is disclosed. A specific glass seal in accordance with this invention is formed from a composition which contains 50 parts by weight glass, 38 parts by weight iron and 4 parts by weight aluminum.

---

This invention relates to an improved ceramic-to-metal conductive glass seal for spark plugs and the like.

It is common practice in the spark plug art to form a part of the center electrode conductive path which extends through the insulator of a fused mass of glass and conductive material which bonds to the ceramic, the center electrode and the terminal screw, thereby forming an electrically conductive hermetic seal. Such seals are shown, for example, by U.S. Pats. 2,106,578, issued to Karl Schwartzwalder and William Shuford Kirk, and 2,248,415, issued to Karl Schwartzwalder and Alexander S. Rulka. The latter patent discloses a seal consisting of about 50% copper powder and 50% glass. The composition which is presently most commonly used for conductive glass seals in high production automotive-type spark plugs consists of about 58% copper and 42% glass.

Attempts to make an operative conductive metal-glass spark plug seal in which the relatively expensive copper has been replaced with a less expensive metal have not been very successful heretofore. For example, a conductive metal-glass seal containing low cost iron as the conductive metal is not satisfactory due to the porous nature of the resultant iron fused glass mass. The porous iron-glass mass permits air and gas to leak therethrough, thereby not forming the desired hermetic seal within the spark plug insulator centerbore. In practice, a conductive metal-glass seal is formed by first positioning the metal center electrode in the lower part of the insulator centerbore, injecting into the centerbore over the top of the center electrode a charge of the metal-glass seal mixture in powder form, inserting a metal terminal screw into the centerbore and then heating so as to cause the glass seal mixture to soften while simultaneously pressing down on the terminal screw. In this manner pressure is applied to the softened glass material to cause it to densify and to bond to the insulator, the center electrode and the terminal screw. It has been found that the application of pressure to the seal while it is in the softened condition is essential for the reasons indicated, i.e., to assure non-porosity and good bonding of the copper-glass seal. This step is not sufficient to assure the non-porosity and the good bonding of an iron-glass seal.

Because of such pressure having been applied, the finished hardened seal is in something of a stressed condition and if the seal is reheated to a certain temperature, it will rapidly expand and lose its sealing properties. The temperatures to which the seal must be reheated to create such conditions is referred to as the "backup temperature" and is, of course characteristic of the particular seal composition used. The fact is, however, that for most all glass sealing compositions heretofore known, for example those shown in the aforementioned prior patents, the backup temperature is very much lower than the temperature to which the sealing material must be initially heated in order to cause softening during manufacture. As a typical example, the sealing material mixture consisting of 58% copper powder and 42% borosilicate glass powder presently in common use requires heating to 1500–1600° F. to cause softening during processing, and the seal so formed has a backup temperature of 1250 to 1350° F. This can be a problem since under severe operating conditions or improper plug installation, the temperature at the location of the seal can reach a temperature higher than 1350° F. thereby causing a permanent failure of the seal. It is a relatively simple matter, of course, to formulate a seal composition with a somewhat higher initial softening temperature and with a commensurately somewhat higher backup temperature. However, it is not a satisfactory solution to the problem for the reason that the metal parts involved cannot tolerate processing temperatures much in excess of 1700° F. and it would be prohibitively expensive to make such parts of a more resistant metal.

Recent advances in copper-glass seal technology as indicated in U.S. Pat 3,349,275 issued to Jack Blum and James Ezell discloses that copper-glass seals containing 10 to 30 weight percent of a metal taken from the group consisting of zinc and manganese enables the glass seal to have a backup temperature in the range of 1650 to 1750° F.

It is a primary object of this invention to provide a hermetic copper-free conductive glass seal.

It is another object of this invention to provide a low cost hermetic conductive glass seal which is operative at temperatures up to 1650° F. without initially heating the seal mixture above 1600° F.

These and other objects are accomplished by a metal-glass sealing material mixture containing iron and aluminum. The composition of the conductive metal-glass seal consists essentially of 29 to 50 weight percent iron powder, 49 to 68 weight percent glass and 1 to 6 weight percent aluminum. When a spark plug containing the composition described above is heated and pressed with a terminal screw at a seal temperature of between 1500 and 1600° F., the resulting fused mass forms a hermetic conductive glass seal which is durable and operative up to a temperature of at least 1650° F., a temperature which is seldom exceeded at seal location during spark plug operation even under severe operating conditions.

Other objects and advantages of this invention will be apparent from the following detail description, reference being made to the accompanying drawing wherein a preferred embodiment of this invention is shown.

Referring now to the drawing, the spark plug 10 comprises a conventional outer metal shell 12 having a ground electrode 14 welded to the lower end thereof. Positioned within the metal shell 12 and secured in the conventional manner is an insulator 16. The ceramic insulator 16 should preferably be of a high alumina base material containing upwards of 85% aluminum oxide such, for example, as covered by U.S. Pat. 2,760,875 issued to Karl Schwartzwalder and Helen Blair Barlett. Such an insulator has excellent mechanical strength and heat shock resistance along with the ability to form an excellent bond with glass, all these characteristics being of considerable advantage in forming the conductive seal of this invention. The insulator 16 is formed with a centerbore having a lower portion 18 of relatively small diameter, and an upper portion 20 of larger diameter which are connected by insulator centerbore ledge 26. Positioned in the lower portion 18 of the insulator centerbore is the center electrode 22. The center electrode 22 has an enlarged head 24 at the upper end thereof which rests on the insulator centerbore ledge 26 and a serrated lower end 28 thereof projecting beyond the lower tip of the insulator 16. Positioned in the upper portion 20 of the insulator centerbore is the terminal screw 32. A metal-glass seal 30 forms a hermetic conductive seal in the insulator centerbore portion 20. The conductive metal-glass seal 30 is bonded to the center electrode head 24, the terminal screw 32 and the inner walls of the ceramic insulator to provide an electrically conductive path from the terminal screw 32 to the center electrode 22 and to provide a hermetic seal in the insulator centerbore portion 20.

In accordance with the present invention the metal-glass seal 30 is a dense, fused mass of iron, aluminum and glass consisting essentially of 29 to 50 weight percent iron, 49 to 68 weight percent glass and 1 to 6 weight percent aluminum. The concentration of iron should be 29 to 50 weight percent in order to obtain a seal with a resistance of less than one ohm, the resistance commonly used in spark plug seal systems. The preferred iron concentration is 39 to 43 weight percent.

The presence of 1 to 6 weight percent aluminum in the iron-glass seal composition enables the glass seal to be substantially non-porous thereby forming a hermetic seal as well as enabling the glass seal to have a high backup temperature, for example, in the range of 1650 to 1750° F. Iron-glass seal compositions containing less than 1 weight percent aluminum do not form a hermetic seal. Seals having aluminum concentrations greater than 6 weight percent leak at elevated temperatures. The preferred aluminum concentration is 2 to 4 weight percent.

We are unable to explain at this time why the presence of aluminum in an iron-glass seal results in an air-tight or hermetic metal-glass seal. In regard to the high backup temperature of the iron-aluminum-glass seal, it has been observed that aluminum apparently alloys to some extent with iron to form an aluminum-iron alloy which at low concentrations seems to contribute to a high backup temperature. The glass in the metal-glass seal is the conventional borosilicate-type glass commonly known as Pyrex, which is presently being used in the production of automotive spark plugs. The composition of a preferred borosilicate glass is 65% by weight $SiO_2$, 23% by weight $B_2O_3$, 5% by weight $Al_2O_3$ and 7% by weight $Na_2O$. This glass will be hereafter referred to as glass A. Other glass frit compositions may be used in the seal as long as they soften at a temperature between 1560 and 1600° F. The composition of the glass in the metal-glass seal is not critical. The concentration of the glass is 49 to 68 weight percent with the preferred glass concentration range being from about 52 to 56 weight percent. The mesh size of the glass powder does not appreciably affect the performance of the seal, a mesh size of 200 for the glass powder was found to be satisfactory.

Another component which may be added if desired in the metal-glass seal composition is a binder. A small amount of organic binder such as hydrogenated cottonseed oil may be admixed with the powder and the mixture, then compressed into a self-sustaining pellet which will serve as a convenient manner of inserting the desired amount of powdered mixture into the insulator centerbore. The organic binder, of course, decomposes and goes off as a gas during the heating and pressing operation. The amount of binder in the mixture ranges from 1 to 3%. Other well known organic binders which decompose and volatilize off which may be used are carboxyl methyl cellulose, paraffin wax, dextrin, and the like.

A preferred embodiment of the present invention is a glass seal mixture having a composition of 38 parts by weight iron powder, 4 parts by weight aluminum powder and 50 parts by weight glass A. This metal-glass powder mixture is mixed with 1 part hydrogenated cottonseed oil, wetted with a dextrin solution and then placed in the insulator centerbore and tamped. The metal terminal screw is then placed into the centerbore and the glass seal mixture heated to a temperature of 1500° F. to 1600° F. As the glass seal mixture is softened, the terminal screw is pressed down into the soft glass seal mixture. Upon cooling, a hermetic conductive seal is formed. This seal has to be reheated to a temperature above 1650° F. before it loses its sealing properties; that is, the backup temperature of this seal is higher than 1650° F.

The following table discloses examples of the present invention which formed hermetic seals having a backup temperature higher than 1650° F.

CONCENTRATION, PARTS BY WEIGHT

| Example: | Fe | Al | Glass A |
|---|---|---|---|
| A | 38 | 4 | 50 |
| B | 38 | 6 | 50 |
| C | 38 | 2 | 50 |
| D | 23 | 4 | 50 |
| E | 70 | 4 | 50 |
| F | 38 | 4 | 40 |
| G | 38 | 4 | 90 |

While the invention has been described in terms of specific examples, it is to be understood that it is not limited thereby except as defined in the following claims.

What is claimed is:

1. An electrically conductive hermetic seal adapted to operate at temperatures up to 1650° F. in a ceramic insulator consisting essentially of 29 to 50 weight percent iron, 1 to 6 weight percent aluminum and 49 to 68 weight percent glass, said glass having a softening temperature of between 1560 and 1600° F.

2. A seal as described in claim 1 wherein said seal contains 2 to 4 weight percent aluminum.

3. A sealing composition for forming an electrically conductive hermetic seal in a ceramic insulator at a temperature of 1600° F. or below, said seal adapted to operate hermetically at temperatures up to 1650° F., said sealing composition containing about 39 to 43 parts by weight iron powder, about 2 to 4 parts by weight aluminum and about 52 to 56 parts by weight boro-silicate glass.

4. A spark plug comprising a ceramic insulator having a centerbore therethrough, a metal member in said centerbore, and a dense fused electrically conductive mass bonded to said metal member and bonded to said ceramic insulator to form a hermetic seal in said centerbore, said hermetic seal adapted to operate hermetically at temperatures up to 1650° F., said mass consisting essentially of 29 to 50 weight percent iron, 1 to 6 weight percent aluminum and 49 to 68 weight percent glass, said glass having a softening temperature of between 1560 and 1600° F.

5. A spark plug as described in claim 4 wherein said mass consists of 39 to 43 weight percent iron, 2 to 4 weight percent aluminum and 52 to 56 weight percent boro-silicate glass.

References Cited

UNITED STATES PATENTS 2,695,240  11/1954  Oshry _____ 106—46
3,076,908  2/1963  Pfaender _____ 252—512
3,247,132  4/1966  Schurecht et al. _____ 252—514

DOUGLAS J. DRUMMOND, Primary Examiner

U.S. Cl. X.R.

106—54; 313—144